United States Patent

Rodal

Patent Number: 5,883,596
Date of Patent: *Mar. 16, 1999

[54] GPS TIMING RECEIVER USING OVERSAMPLING

[75] Inventor: Eric B. Rodal, Morgan Hill, Calif.

[73] Assignee: Trimble Navigation Limited, Sunnyvale, Calif.

[*] Notice: The term of this patent shall not extend beyond the expiration date of Pat. No. 5,748,144.

[21] Appl. No.: 970,051

[22] Filed: Nov. 13, 1997

Related U.S. Application Data

[63] Continuation of Ser. No. 592,051, Jan. 26, 1996, Pat. No. 5,748,144.

[51] Int. Cl.$^6$ .............................. H04B 7/185; G01S 5/02
[52] U.S. Cl. .......................................... 342/357; 701/213
[58] Field of Search .............................. 342/357; 701/213

[56] References Cited

U.S. PATENT DOCUMENTS

| | | | |
|---|---|---|---|
| 5,041,833 | 8/1991 | Weinberg | 342/357 |
| 5,185,610 | 2/1993 | Ward et al. | 342/357 |
| 5,440,313 | 8/1995 | Osterdock et al. | 342/357 |

Primary Examiner—Theodore M. Blum
Attorney, Agent, or Firm—David R. Gildea

[57] ABSTRACT

A GPS timing receiver for providing a GPS-derived time signal. The GPS timing receiver includes a filter for filtering a GPS signal to a certain information bandwidth, a reference clock for generating a reference clock signal having a clock rate at least ten times the information bandwidth, a sampler using the reference clock signal for oversampling the filtered GPS signal, a correlation subsystem including a microprocessor for correlating the sampled GPS signal to the reference clock signal to measure a time difference between the GPS signal and the reference clock signal, and a time clock to issue a GPS-derived time signal based upon the reference clock signal and adjusted by the measured time difference in increments of the period of the reference clock signal. An optional frequency multiplier multiplies the reference clock rate enabling the time clock to adjust the GPS-derived time signal in increments of the period of the frequency multiplied reference clock signal.

8 Claims, 1 Drawing Sheet

5,883,596

GPS TIMING RECEIVER USING OVERSAMPLING

This application is a continuation of application Ser. No. 08/592,051, filed Jan. 26, 1996, now U.S. Pat. No. 5,748,144.

BACKGROUND OF THE INVENTION

1. Field of the Invention

The invention relates generally to GPS receivers and more particularly to a GPS timing receiver for providing a GPS-derived time signal having a fine incremental time resolution.

2. Description of the Prior Art

The global positioning system (GPS) is commonly used by GPS timing receivers for deriving a GPS time signal. Typically, the GPS-derived time signal has the form of pulse train having one pulse per second, each pulse coincident or having a known offset with the start of each second of GPS time. One application for the GPS-derived time signal is calibrating an atomic clock. Before GPS was available it was sometimes required to transport the atomic clock to the location of a time standard such as the National Bureau of Standards in Colorado in order to perform the calibration. Another application of the GPS-derived time signal is providing a precise time signal for timing TDMA and CDMA receivers in wireless and satellite systems. An important figure of merit for a GPS timing receiver is the fineness of the time steps (incremental time resolution) of the GPS-derived time signal. A fine time step or small incremental time resolution is necessary in order to minimize the time difference between the time provided by the GPS-derived time signal and the actual GPS time.

Existing GPS timing receivers operate by downconverting the GPS satellite signal to a GPS intermediate frequency (IF) signal having a certain pre-detection information bandwidth and then sampling the GPS IF signal with a clock signal. The sampled GPS IF signal is then correlated with an internally generated GPS replica signal to obtain correlation data. The time, repetition rate, and frequency of the GPS replica signal are derived from the clock signal and then adjusted by the correlation data to drive the GPS replica signal to correlate to the time, repetition rate, and frequency of the GPS IF signal. It is desirable for the GPS IF signal to have a narrow pre-detection information bandwidth in order to minimize jamming from spurious signals that are close in frequency to the GPS satellite signal and to achieve the best signal-to-noise ratio. The clock signal must have a frequency at least as high as the Nyquist sampling rule rate of two times the information bandwidth or information will be lost in the sampling process. In order to minimize cost and power consumption, the frequency of the clock signal is typically as low as practical above the Nyquist rate. The GPS-derived time signal is then generated from the clock signal and information in the correlation data using one of several known techniques.

In one technique, the GPS derived time signal is generated by frequency dividing the clock signal to the desired frequency and then delaying the divided signal in an analog delay line having several output taps. A digital signal representing the correlation data for the time difference between the GPS IF signal and the GPS replica signal then selects the output tap that minimizes the time difference. A fine incremental time resolution is obtained by having closely spaced output taps. This technique was used in a GPS receiver model "5000A Timer" that was commercially available from Trimble Navigation of Sunnyvale, Calif. beginning in 1983. However, a disadvantage of this technique is that a tapped analog delay line is required in order to obtain fine time resolution.

Another technique used in existing GPS receivers uses a voltage controlled oscillator (VCO) having a small tuning range for providing the clock signal. A digital signal representing the correlation data for the frequency difference between the GPS IF signal and the GPS replica signal is converted to an analog signal in a digital-to-analog converter (DAC) which is then used to drive the VCO to adjust the time and frequency of the clock signal so that the time, repetition rate, and frequency of the GPS replica signal matches the GPS IF signal. The clock signal is then frequency divided to get the desired frequency for the GPS-derived time signal. An example of such a GPS receiver is a model "4000S Surveyor" that was commercially available from Trimble Navigation beginning in 1987. A disadvantage of this technique is that absolute time can be lost in frequency dividing the clock signal. A further disadvantage is that the frequency resolution and accuracy of the GPS-derived time signal is limited by the resolution and accuracy of the DAC. Typically, the DAC is required to be monotonic with a resolution of more than sixteen bits. Such DACs are expensive.

In another technique, the GPS-derived time signal is obtained by frequency dividing the clock signal by a divide number that is dynamically adjusted according to the correlation data for the time difference between the GPS IF signal and the GPS replica signal. A disadvantage of this technique is that dynamically adjusting the divide number creates phase noise or jitter in the GPS-derived time signal. In yet another technique the GPS-derived time signal is obtained by frequency dividing the clock signal by a divide number that is fixed. The frequency divided signal is then digitally delayed in a circuit such as a shift register that is clocked by the clock signal. The incremental time resolution is determined by the period of the clock signal. A fine time resolution is obtained by having a high frequency clock signal. However, GPS receivers using this technique typically suffer from relatively poor jamming immunity and poor signal-to-noise ratio due to having a wide pre-detection information bandwidth corresponding to the high frequency clock signal.

All of the existing or known techniques for generating the GPS-derived time signal having a fine incremental time resolution suffer from one or several disadvantages. What is needed is a GPS timing receiver having a narrow pre-detection information bandwidth and providing a fine incremental time resolution without resorting to an analog delay line.

SUMMARY OF THE INVENTION

It is therefore an object of the present invention is to provide an improved GPS timing receiver for receiving a GPS signal in a narrow pre-detection information bandwidth and providing a GPS-derived time signal having a fine incremental time resolution.

Another object is to provide a GPS timing receiver providing a GPS-derived time signal by adjusting a delay of a time signal by a multiple of the period of a clock signal used for sampling a GPS signal.

Another object is to provide a GPS timing receiver using oversampling for sampling a GPS signal.

Another object is to provide a GPS timing receiver providing a GPS-derived time signal by frequency multiplying a clock signal and adjusting a delay of a time signal by a multiple of the period of the frequency multiplied clock signal.

Briefly, in a preferred embodiment, the GPS timing receiver of the present invention includes a filter for filtering a GPS signal to a certain information bandwidth, a reference clock for generating a reference clock signal having a clock rate at least ten times the information bandwidth, a sampler to oversample the filtered GPS signal with the reference clock signal, a correlation subsystem, including a microprocessor, for correlating the sampled GPS signal to a GPS replica signal derived from the reference clock signal in order to measure a time difference between the GPS signal and the reference clock signal, and a time clock to issue a GPS-derived time signal having a time and repetition rate based upon the reference clock signal and delayed in time resolution increments of the period of the reference clock signal according to the measured time difference to correspond closely to GPS time. The time clock can include a frequency multiplier for multiplying the frequency of the reference clock signal for providing a shorter period for decreasing the size of the time resolution increments.

An advantage of the GPS timing receiver of the present invention is that it provides a GPS-derived time signal having a fine time resolution while simultaneously providing a narrow pre-detection information bandwidth for reducing jamming from a spurious signals and improving the signal-to noise ratio for the GPS signal.

Another advantage of the GPS timing receiver of the present invention is that it provides a GPS-derived time signal having a fine incremental time resolution by continuously adjusting a delay of a time signal in increments of the period of a clock signal.

Another advantage of the GPS timing receiver of the present invention is that it uses oversampling for improving the incremental time resolution of a GPS-derived time signal by decreasing the period of the clock signal.

Another advantage of the GPS timing receiver of the present invention is that it multiplies the frequency of a clock signal for improving the incremental time resolution of the GPS-derived time signal.

These and other objects and advantages of the present invention will no doubt become obvious to those of ordinary skill in the art after having read the following detailed description of the preferred embodiments which are illustrated in the various figures.

IN THE DRAWINGS

FIG. 1 is a block diagram of a GPS timing receiver of the present invention.

DETAILED DESCRIPTION OF THE PREFERRED EMBODIMENTS

Figure 1:
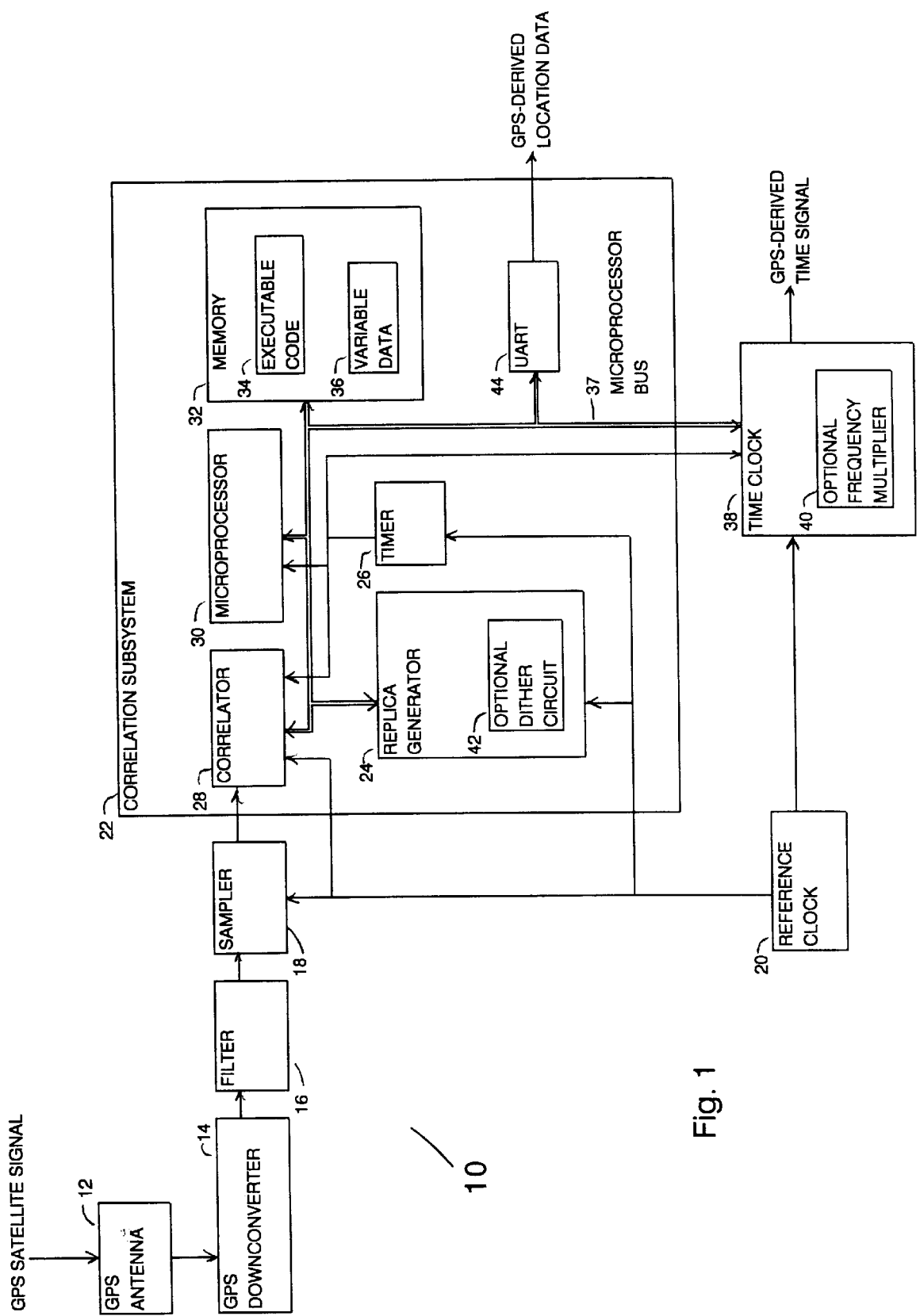

FIG. 1 illustrates a block diagram of a GPS timing receiver of the present invention referred to by the general reference number 10. The GPS timing receiver 10 includes a GPS antenna 12 for receiving a GPS satellite signal and issuing a responsive conducted electrical GPS signal to a GPS downconverter 14. The GPS satellite signal includes a GPS carrier modulated with a coarse/acquisition (C/A) code from one or more GPS satellites. The C/A code is spread with a pseudorandom (PRN) code that is unique for each GPS satellite and repeats at a precise rate that is controlled by atomic clocks in the GPS satellite. The GPS timing receiver 10 uses the precise repetition rate of the PRN spread C/A code to provide a GPS-derived time signal.

The GPS downconverter 14 downconverts the GPS signal to an intermediate frequency (IF) and issues a GPS IF signal to a filter 16. In a preferred embodiment, the GPS IF signal is composed of I and Q signal components. The filter 16 filters the GPS IF signal and issues a filtered GPS signal to a sampler 18. In order to reduce or eliminate spurious signals having frequencies close to the frequency of the GPS carrier and to achieve the best signal-to-noise ratio for the GPS signal, the filter 16 should have the lowest information bandwidth that will pass the C/A code information in the GPS IF signal. In a preferred embodiment, the filter 16 filters the GPS IF signal I and Q signal components to an information bandwidth of approximately one megahertz. The sampler 18 quantizes or limits the GPS IF signal and then oversamples the quantized or limited GPS IF signal at a positive or negative going transition of a reference clock signal received from a reference clock 20 and passes a sampled GPS IF signal to a correlation subsystem 22.

According to the well-known Nyquist sampling rate rule, the minimum sampling frequency for retaining all the information in a signal is slightly more than twice the bandwidth of the information in the signal. For example, in the above preferred embodiment where the information bandwidth is approximately one megahertz, the minimum sampling frequency is slightly greater than approximately two megahertz. An advantage of sampling at the minimum rate is that the power consumption and component cost of the reference clock 20 and all circuits receiving the reference clock signal are minimized. However, in the present invention the reference clock signal samples the GPS IF signal at a clock rate in a range of ten megahertz to two hundred megahertz and at least ten times the information bandwidth or at least approximately five times the Nyquist sampling rate. The period of the reference clock signal is the inverse of the clock rate for a range of one-hundred nanoseconds to five nanoseconds. In a preferred embodiment for an information bandwidth of one megahertz, the reference clock rate is twenty-five megahertz and the reference clock period is forty nanoseconds.

The correlation subsystem 22 includes at least one replica generator 24 to generate or retrieve the PRN codes for the GPS satellites of interest and provide a replica of the GPS IF signal based upon the PRN codes and the reference clock signal. The GPS replica signal includes a replica C/A code spread by the PRN code, a replica carrier frequency and a time of arrival of the replica C/A code. In a preferred embodiment, a timer 26 divides the reference clock rate to provide an event timer signal to at least one correlator 28. The correlator 28, clocked by the reference clock signal, uses the GPS replica signal to downconvert and de-spread the C/A code information in the GPS IF signal and uses the event timer signal to synchronize correlation data words for a correlation of the GPS IF signal and the GPS replica signal. In a preferred embodiment, the event timer signal has a period of approximately one-half millisecond. Several of the replica generator 24 and/or the correlator 28 may be used in order to track several GPS satellites in parallel, speed the acquisition of the GPS satellite signal, and/or track a greater rate of acceleration of the GPS timing receiver 10.

The correlation subsystem 22 further includes a microprocessor 30, a memory 32 for storing executable code 34 and variable data 36, and associated hardware coupled through a microprocessor bus 37 operating in a convention manner to the replica generator 24 and the correlator 28. The microprocessor 30 responds to an interrupt from the event timer signal to read the correlation data words and to write a time adjustment, a frequency adjustment, and a GPS satellite selection to the replica generator 24 in order to drive the GPS replica signal to correlate to the GPS IF signal for acquiring and then tracking one or more selected GPS satellites; and to issue a time adjustment signal representing a measured time difference between the sampled GPS IF signal and the GPS replica signal.

A time clock 38 receives the time adjustment signal and generates a GPS-derived time signal by dividing the clock rate of the reference clock signal or the event timer signal to generate a time clock signal. The time clock signal is then delayed according to the time adjustment signal for a delay time in increments of the period of the reference clock signal in order to most closely match the measured time difference. In a preferred embodiment, the time clock 38 includes a double-buffered counter integrated circuit that is pre-loaded with a start number provided from the microprocessor 30 in the time adjustment signal. Starting at the start number, the counter increments a count with each cycle of the reference clock signal until a pre-determined maximum count is reached. When the maximum count is reached the counter generates a pulse and starts counting again from the start number. By varying the start number with the time adjustment signal, the microprocessor 30 continuously adjusts the time delay in order to provide the GPS-derived time signal that closely matches GPS time. In a preferred embodiment, the pulses have a repetition rate of approximately one pulse per second or one Hertz.

The time clock 38 may optionally include a frequency multiplier 40 to multiply the clock rate of the reference clock signal by a selected multiplication factor and issue a second clock signal. Several electronic circuits can be used for the frequency multiplier 40, such as a phase lock loop having frequency dividers in the feedback path, a fractional N loop, a frequency lock loop, an injection locked oscillator, or a direct frequency multiplier using a non linear device such as a diode or transistor, depending upon the multiplication factor desired and the input and output frequencies. In a preferred embodiment, the frequency multiplier 40 uses a phase lock loop. The time clock 38 is clocked by the second clock signal to delay the time clock signal in increments of the period of the second clock signal. Because the period of the second clock signal is less than the period of the reference clock signal, a finer incremental time resolution is obtained and the GPS-derived time signal can more closely match the measured time difference between GPS IF signal and the GPS replica signal.

The correlation subsystem 22 may optionally include a dither circuit 42 to vary (dither) the code time of arrival and/or frequency of the GPS replica signal according a dither sequence that is random or nearly random. By varying the replica code time of arrival with the dither sequence to bounce between early and late in relation to the time of arrival of the PRN spread C/A code in the GPS IF signal, the time accuracy of the time adjustment signal can be improved by a factor of approximately the length of the dither sequence. The frequency multiplier 40 can be used with or without oversampling.

A universal asynchronous/synchronous receiver transmitter (UART) 44 receives GPS-derived information for location, velocity, and/or time in a parallel signal from the microprocessor 30 and converts the information to a serial GPS-derived location data signal.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A global positioning system (GPS) receiver, including:
    a filter for receiving a GPS signal having a GPS pseudo-random (PRN) code, for filtering said GPS signal, and for issuing a filtered GPS signal having an information bandwidth;
    a sampler, coupled to the filter, for oversampling the filtered GPS signal with a first clock signal having a first clock rate at least five times the information bandwidth and providing an oversampled GPS signal;
    correlation means, coupled to the sampler, for correlating said oversampled GPS signal to an internally generated replica signal having a replica PRN code synchronized to said first clock signal, for measuring a time difference between said GPS PRN code and said replica PRN code, and providing a time adjustment signal representative of said measured time difference; and
    a time clock for receiving said first clock signal and said time adjustment signal, generating a time signal synchronized to said first clock signal and having a time signal rate lower than said first clock rate, and providing a GPS-derived time signal by delaying said time signal according to said time adjustment signal by a multiple of the period of said first clock signal that most closely compensates for said measured time difference.

2. The GPS receiver of claim 1, wherein:
    said multiple of said period of said first clock signal is an integer.

3. The GPS receiver of claim 1, wherein:
    the time clock includes frequency multiplier means for multiplying said first clock rate by a selected multiplication factor and issuing a second clock signal having a second clock rate higher than said first clock rate; and
    the time clock means is further for providing said GPS-derived time signal by delaying said time signal by a multiple of the period of said second clock signal.

4. The GPS receiver of claim 1, wherein:
    the correlation means includes dither means for dithering said replica PRN code between a first time and a second time in order to minimize a difference between said measured time difference and an actual time difference between said GPS PRN code and said replica PRN code.

5. A method for providing a GPS-derived time signal, comprising steps of:
    receiving a GPS signal having a GPS pseudorandom (PRN) code;
    filtering said GPS signal and issuing a filtered GPS signal having an information bandwidth;
    oversampling the filtered GPS signal with a first clock signal having a first clock rate at least five times the information bandwidth and providing an oversampled GPS signal;
    correlating said oversampled GPS signal to an internally generated replica signal having a replica PRN code synchronized to said first clock signal;
    providing a time adjustment signal representative of a measured time difference between said GPS PRN code and said replica PRN code;
    generating a time signal synchronized to said first clock signal and having a time signal rate lower than said first clock rate; and delaying said time signal according to said time adjustment signal by a multiple of the period of said first clock signal that most closely compensates for said measured time difference.

6. The method claim 5, wherein:

said multiple of said period of said first clock signal is an integer.

7. The method of claim 5, further including a step of:

multiplying said first clock rate by a selected multiplication factor to generate a second clock signal having a second clock rate higher than said first clock rate; and wherein delaying said time signal includes delaying said time signal by a multiple of the period of said second clock signal.

8. The method of claim 5, further including a step of:

dithering said replica PRN code between a first time and a second time in order to minimize a difference between said measured time difference and an actual time difference between said GPS PRN code and said replica PRN code.

* * * * *